United States Patent [19]

Duran

[11] Patent Number: 5,006,025
[45] Date of Patent: Apr. 9, 1991

[54] SELF-LOCKING NUT

[75] Inventor: John A. Duran, Glendora, Calif.

[73] Assignee: Avibank Mfg., Inc., Burbank, Calif.

[21] Appl. No.: 450,284

[22] Filed: Dec. 13, 1989

[51] Int. Cl.⁵ ............................................. F16B 37/04
[52] U.S. Cl. ................................... 411/183; 411/108; 411/113; 411/177
[58] Field of Search ............... 411/103, 108, 173, 177, 411/181, 183, 303, 361, 277, 353, 112, 113, 107

[56] References Cited

U.S. PATENT DOCUMENTS

| | | | |
|---|---|---|---|
| 1,813,968 | 7/1931 | Simons | 411/183 |
| 2,174,549 | 10/1939 | Blaho | 411/183 |
| 2,255,964 | 9/1941 | Blaho | 411/183 |
| 3,252,493 | 5/1966 | Smith | 411/108 |
| 3,360,890 | 1/1968 | Dooley, Jr. | 411/277 |
| 3,443,617 | 5/1969 | Whiteside et al. | 411/181 |
| 3,640,327 | 2/1972 | Burt | 411/108 |
| 3,797,547 | 3/1974 | Shinjo | 411/303 |
| 4,464,090 | 8/1984 | Duran | 411/103 |
| 4,475,859 | 10/1984 | Oliver | 411/361 |
| 4,735,536 | 4/1988 | Duran | 411/353 |
| 4,828,442 | 5/1989 | Duran | 411/353 |

FOREIGN PATENT DOCUMENTS 2180905 4/1987 United Kingdom .

*Primary Examiner*—Neill R. Wilson
*Attorney, Agent, or Firm*—Poms, Smith, Lande & Rose

[57] ABSTRACT

A self-locking nut having an enlarged head and an elongated shank portion insertable into a hole in a panel. The nut has an integral skirt portion adjacent the underside of the head having a predetermined skirt length, which skirt is then deformed against the underside of the panel to hold the nut in firm position with respect to the panel. The nut may be provided with an irregularly shaped head conforming to a like configured countersunk in the panel leading into the hole to prevent rotation of the nut about its longitudinal axis.

51 Claims, 6 Drawing Sheets

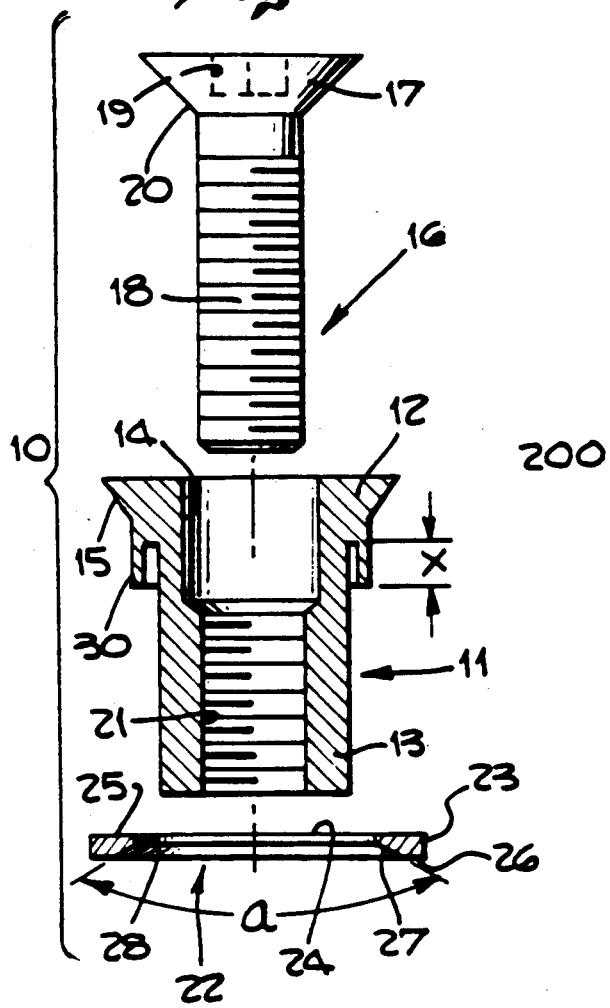
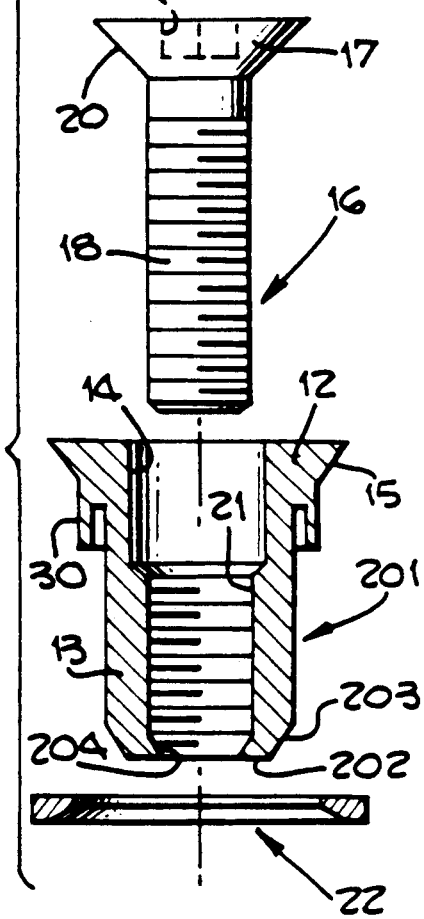
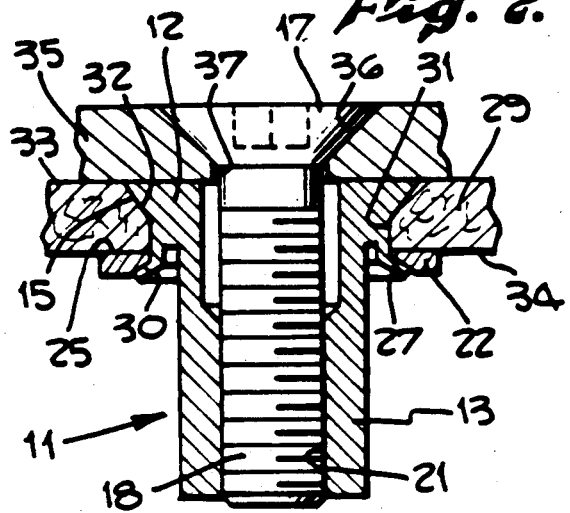
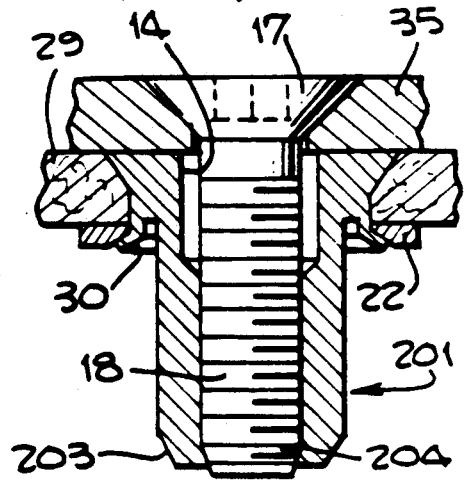

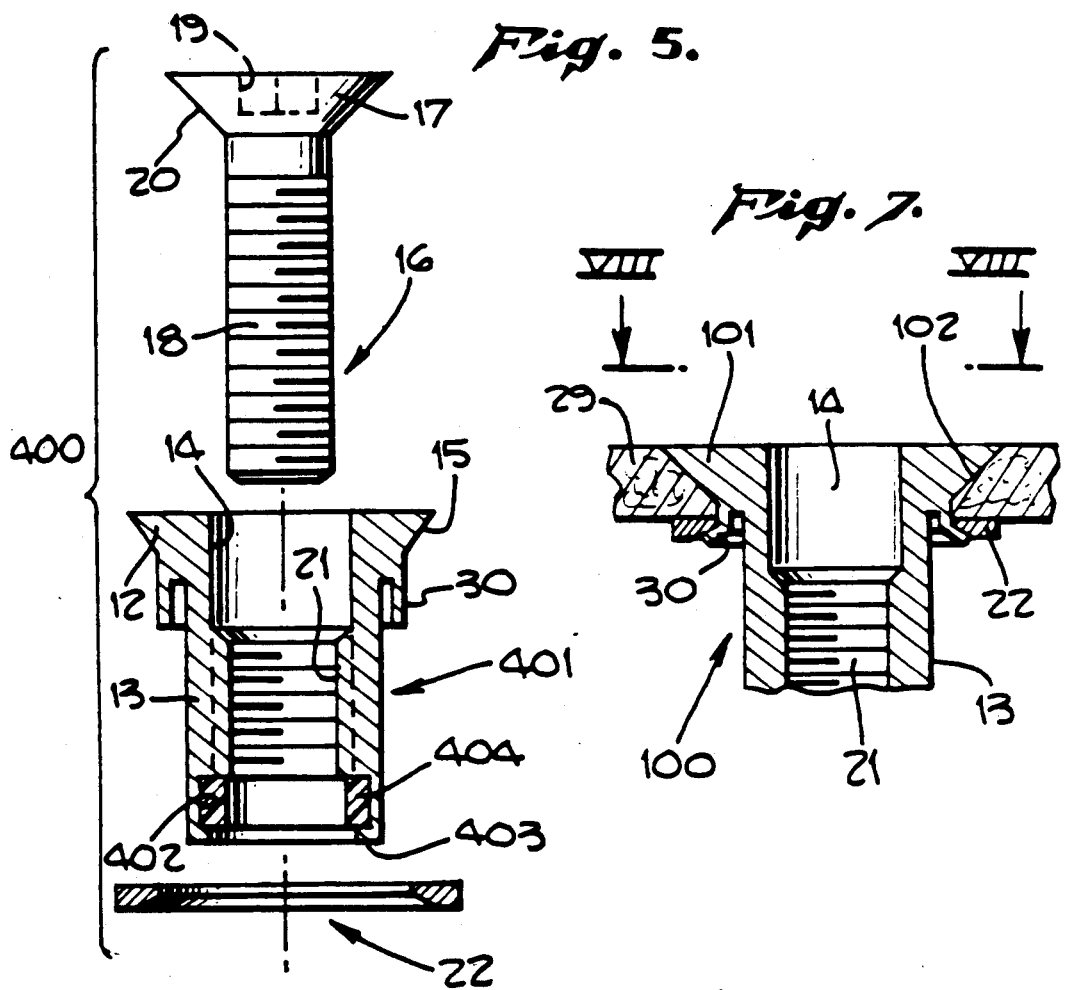
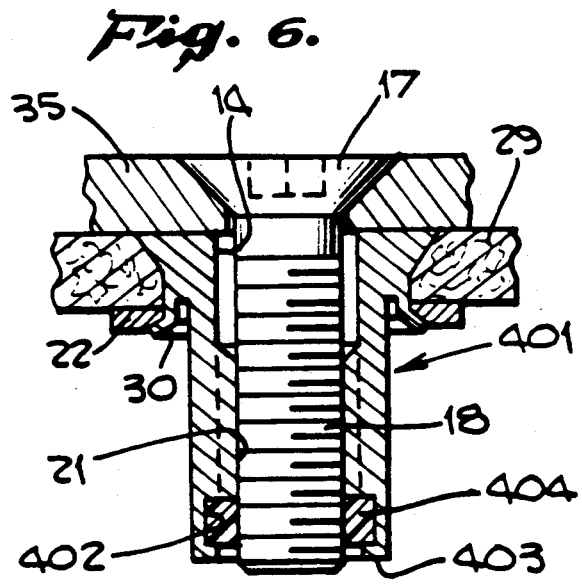
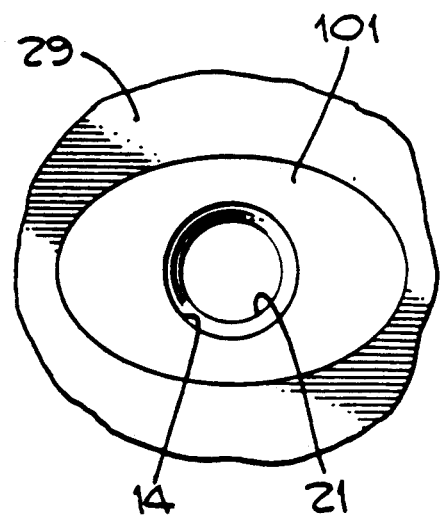

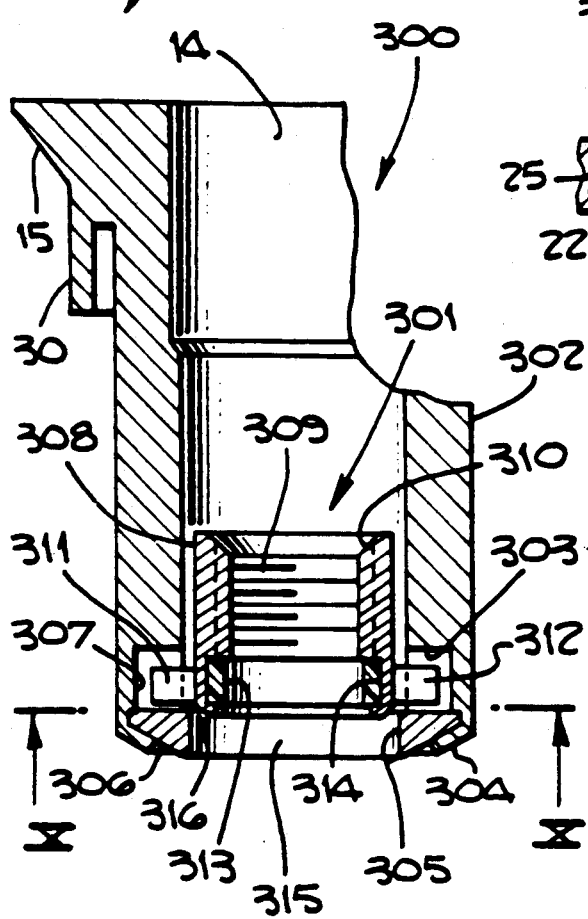
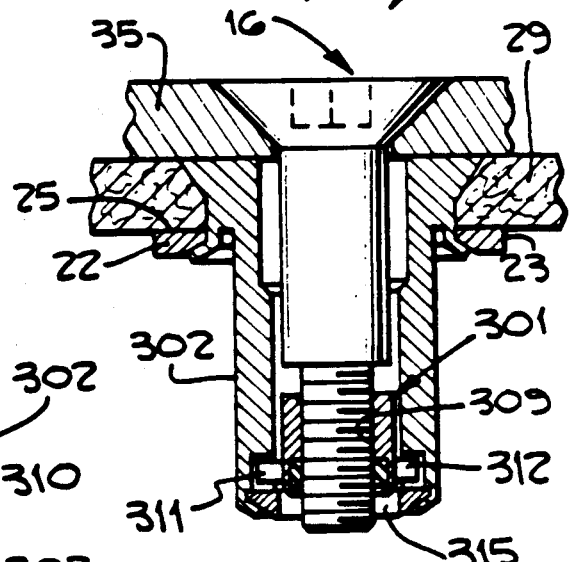
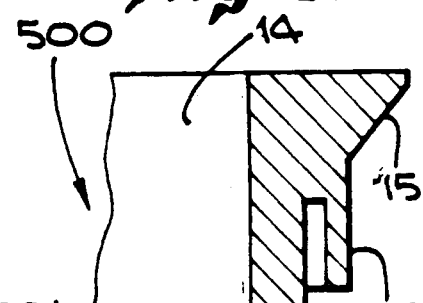
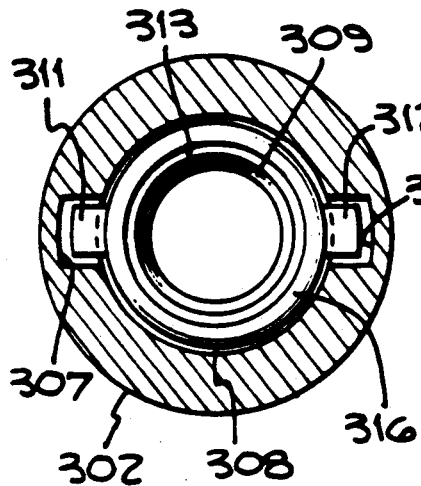
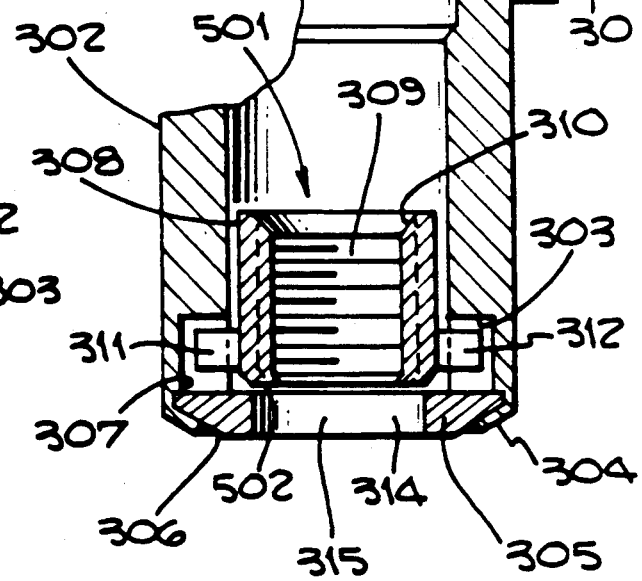

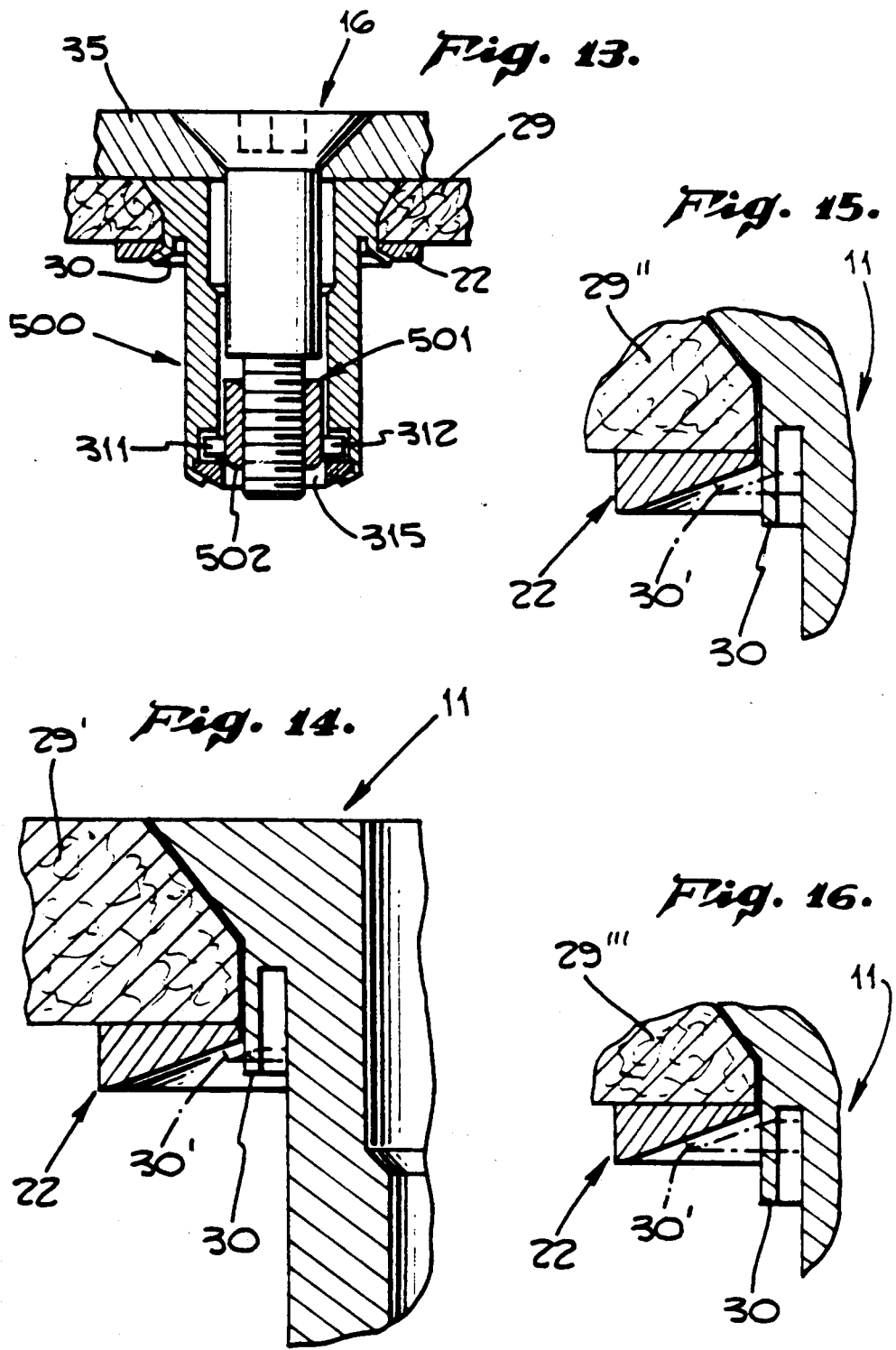

SELF-LOCKING NUT

BACKGROUND OF THE INVENTION

1. Field of the Invention

The invention relates to nuts; and, particularly, to nuts useful in aircraft panels that are self-locking to the panel.

2. Description of the Prior Art

Various types of nuts and bolts are used in the aircraft industry. Certain nuts or bolts have an enlarged flush head which head is disposed in a countersunk opening in an aircraft panel, the nut or bolt having a shank portion extending through the opening to the other side of the panel. It is desirable to secure such nuts or bolts to the panel prior to securing the nut or bolt to a fastener, such as a threaded member mating with a threaded portion of the nut or bolt.

However, certain panels, such as panels of composite material, vary in thickness, e.g., from 0.110" to 0.140" thick for a given panel thickness of 0.125", and it is difficult to provide a standardized nut or bolt that can be easily locked to the panel. Further, certain fasteners, such as nuts that are installed by means of expansion or collapsing, are not suitable for use in composite panels as the installation operation can cause cracking or fissures in the panel.

There is thus a need for a nut having self-locking means for locking the same to panels of varying thickness, without damaging the panel.

SUMMARY OF THE INVENTION

It is an object of this invention to provide a nut which is self-locking in an opening through a panel.

It is a further object of this invention to provide a nut for installation in a panel having a predetermined skirt length and a washer having a predetermined angle so that the nut can be swaged to the washer depending upon the panel thickness of the installation.

It is still another object of this invention to provide a self-locking nut for a panel which cannot rotate about its longitudinal axis when installed in the panel.

It is a further object of this invention to provide a self-locking nut having a threaded portion for threaded engagement to a fastening member.

It is still further an object of this invention to provide a self-locking nut having an internal floating threaded nut portion adapted for threaded engagement to a fastening member.

These and other objects are preferably accomplished by providing a self-locking nut having an enlarged head and an elongated shank portion insertable into a hole in a panel. The nut has an integral skirt portion adjacent the underside of the head which can be provided in any desired length, depending on the panel thickness, then deformed against the tapered surface of a washer mounted against the underside of the panel to hold the nut in firm position with respect to the panel. The nut may be provided with an irregularly shaped head conforming to a like configured countersunk in the panel leading into the hole to prevent rotation of the nut about its longitudinal axis.

The nut may have an internal threaded portion which may be an integral part of the shank portion or a floating nut portion retained within the shank portion for threaded engagement to a fastening member and self-locking means may be provided between the nut and the fastening member.

BRIEF DESCRIPTION OF THE DRAWINGS

FIG. 1 is an exploded view of a fastener assembly in accordance with the teachings of the invention;

FIG. 2 is an assembled vertical sectional view of the fastener assembly of FIG. 1, shown assembled to a pair of panels;

FIG. 3 is an exploded view of a modified fastener assembly in accordance with the teachings of the invention having a self-locking feature;

FIG. 4 is an assembled vertical sectional view of the fastener assembly of FIG. 3;

FIG. 5 is an exploded view of a second modification of the assembly of the invention with another self-locking feature;

FIG. 6 is an assembled vertical sectional view of the assembly of FIG. 5;

FIG. 7 is a vertical view of a modification of the nut alone of FIG. 1 mounted in the panel of FIG. 2;

FIG. 8 is a view taken along lines VIII—VIII of FIG. 7;

FIG. 9 is a vertical view of a modification of a nut in accordance with the invention;

FIG. 10 is a view taken along lines X—X of FIG. 9;

FIG. 11 is an assembled vertical sectional view of the assembly of FIG. 10;

FIG. 12 is a vertical view of another modification of a nut in accordance with the invention;

FIG. 13 is an assembled vertical sectional view of the assembly of FIG. 12;

FIGS. 14 to 16 illustrate the use of one nut having a predetermined skirt length in panels of varying thicknesses.

DESCRIPTION OF THE PREFERRED EMBODIMENT

Figure 17:
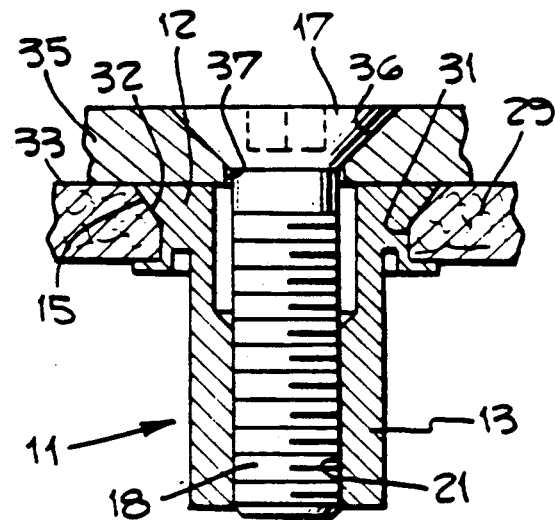
FIGS. 17 to 21 are views similar to FIGS. 2, 4, 6, 11 and 13, respectively, with the washer eliminated.

Referring now to FIG. 1 of the invention, there is shown a fastener assembly 10 comprising a nut 11 adapted to mate with a threaded member 16. Nut 11 has an enlarged head 12 with a cavity 14 and an elongated shank 13. The underside 15 of head 12 is tapered is shown as is well known in the art.

The shank portion 13 of nut 11 is generally cylindrical, as shown, and may be provided with an internal threaded portion 21 for threaded engagement to a fastener in the form of threaded member 16. Threaded member 16 may also be a bolt or the like thus having an enlarged head 17, a generally cylindrical threaded shank portion 18, a hex socket 19 in head 17 and a tapered undersurface 20 on head 17. Shank portion 18 is adapted to mate with threaded portion 21 of nut 11, as will be discussed.

Fastener assembly 10 further includes a washer 22 having a generally cylindrical peripheral wall 23, a central opening 24, a flat side 25 (facing nut 11) and a flat side 26 (opposite side 25). Flat side 26 is smaller in width than the width of flat side 25 and a tapered portion 27 leads from the inner peripheral wall 28 outwardly toward the side 26, as shown. The angle of taper a (FIG. 1) may be about 140°.

As particularly contemplated in the present invention, the assembly 10 of the invention includes self-locking means for locking nut 11 to a panel, such as panel 29 (FIG. 2) in which nut 11 is to be installed. In the exemplary embodiment, such self-locking means includes a thin-walled peripheral skirt 30 (FIG. which extends about the exterior of head 12 of nut 11 leading downwardly from tapered portion 15. It is to be understood that skirt 30 may be of any suitable length, for reasons to be discussed.

Thus, as seen in FIG. 2, panel 29 has an opening 31 therein with a counterbore 32 leading into opening 31. The underside tapered surface 15 of nut 11 conforms to counterbore 32 and fits snugly therein so that the exterior of head 12 is flush with the outside or access side 33 of panel 29. The shank portion 13 of nut 11 extends through opening 31 to and past the blind side 34 of panel 29.

Fastening member 16 is disposed in a panel 35, the head 17 thereof fitting into and conforming to a countersunk 36 in panel 35 leading to hole 37 therethrough. The threaded shank portion 18 of member 16 is shown mating with threaded portion 21 of nut 11 and can thus be threaded thereto to retain panel 29 to adjacent panel 35. Of course, fastening member 16 may be any suitable type of fastening member, and secured to any suitable equipment or apparatus, and thus releasably securing the same to nut 11.

However, as heretofore discussed, skirt 30 is of a precut length so that, when nut 11 is installed in panel 29, the skirt 30 extends a short distance past the blind side 34 of panel 29. Washer 22 is inserted over shank portion 13 until flat portion 25 abuts against the blind side 34 of panel 29. Skirt 30 is now bent or swaged against the tapered portion 27 of washer 22 thus locking nut 11 to panel 29 yet permitting quick release by merely unbending or unswaging skirt 30 so that it is returned to the FIG. 1 position.

Panel 29 may be made of a composite material. Washer 22 and nut 11 may be made of CRES 304 stainless steel. Skirt 30 may be about 0.50 inches thick.

The nut 11 may be provided with a self-locking feature to lock nut 11 to bolt 16. Thus, as seen in FIG. 3 and 4 wherein like numerals refer to like parts of the assembly of FIG. 1 and 2, fastener assembly 200 comprises nut 201 otherwise identical to nut 11 having a deformed nose 202 providing an outer tapered section 203 and an inwardly extending tapered portion 204. When bolt 16 is threaded to nut 201, the deformed end 202 engages threaded shank 18 and bites into the same to lock nut 201 to bolt 16 to prevent rotation thereof as seen in FIG. 4.

Still another embodiment of the invention is shown in FIGS. 5 and 6 where again like numerals refer to like parts of the embodiment of FIGS. 1 and 2. Another locking means is provided by assembly 400 wherein nut 401, otherwise identical to nut 11, has an inner annular chamber 402 adjacent nose 403. A plastic annular ring or insert 404 is mounted within chamber 402. As seen in FIG. 6, when nut 401 and bolt 16 are installed in panels 29 and 35 as heretofore discussed with respect to the embodiments of FIGS. 1 to 5, insert 404 engages the threaded shank 18 and digs into the same which serves to lock bolt 16 to nut 401 as heretofore discussed with respect to the embodiments of FIGS. 3-5. Insert 404 can be of any suitable relatively soft material, such as a plastic, as, for example, a polyimide resin. It can be seen that there is disclosed a self-locking feature that can be added to the nut and bolt of FIGS. 1 and 2 by crimping or deforming the nose portion of the nut or use of an insert of a resilient material, such as plastic. In my U.S. Pat. No. 4,747,738, Col. 6, in lines 2 to 8 and 51 to 58, I described the use of a plastic insert, such as one of polyimide resin, to provide a friction lock along with deformation of the barrel 55 to accomplishing the same.

Referring now to FIGS. 7 and 8, wherein like parts refer to like parts of the nut and bolt of FIGS. 1 and 2, nut 11 may be provided with an anti-rotation configuration to prevent rotation of nut 11 about its longitudinal axis when mounted in opening 31. Thus, nut 100 (FIG. 7), otherwise identical to nut 11 of FIG. 1, may have an enlarged head 101 (FIG. 8) of elliptical configuration, with a like configured countersunk opening 102 in panel 29. Thus, nut 100 cannot rotate about its longitudinal axis. Further, any suitable non-circular head may be used for nuts 11 and 100. That is, the nut heads may be square-shaped or any other irregular configuration disposed in a like configured hole for preventing rotation.

Although an integral threaded portion 21 is shown on nut 11 in FIG. 1, as seen in FIG. 9-11, wherein like numerals refer to like parts of the assembly of FIG. 1 to 3, nut 300, otherwise identical to nut 11, may have an internal floating threaded nut 301 on the interior thereof replacing threaded portion 21 of nut 11. Thus, the lower end 302 of nut 300 may have a pair of spaced interior slots 303, 307 (FIG. 10) with a thin-walled normally downwardly extending annular skirt 304 which is swaged or deformed inwardly trapping annular washer 305 therein. Washer 305 has an outer tapered surface 306 against which skirt 304 is swaged. Nut 301 has a main cylindrical portion 308 threaded on the interior 309 having a tapered portion 310 leading into the interior 309. A pair of ears 311, 312 are provided at the bottom of main portion 308 extending into and receivable in slots 303, 307, respectively, in a loose fit. It is also noted the thickness of ears 311, 312 is less than the height of slots 303, 307 to provide further for such loose fit. An insert 313 of plastic material, such as a polyimide resin, is disposed within an annular undercut area 314 on the interior of nut 301. Insert 313 is trapped within area 314 by swaging of a thin walled integral portion 316 of nut 301 thereagainst as seen in FIG. 9. As also seen in FIG. 9, a throughbore extends all the way through nut 301 and is aligned with the opening 315 in washer 305 so that the threaded shaft 14 of member 16 of FIGS. 1 and 2 may be threadably receivable within nut 301 and threaded to threaded portion 309 as seen in FIG. 11.

The play between nut 301 and the remainder of nut 300 compensates for misalignment of the panels and openings therethrough. Nut 301 is self-locked to member 16 via insert 313 as heretofore discussed. Also, nut 300 may be provided with an elliptical head and mating countersunk opening as discussed hereinabove with respect to FIG. 7 and 8 (or any other non-circular configuration to provide for anti-rotation of the nut 300).

Another means for self-locking member 16 to a floating nut as in the embodiment shown in FIGS. 9-11 is illustrated in FIGS. 12 and 13 wherein like numerals refer to like parts of the embodiment of FIGS. 9-11. Thus, nut 500 has an internal floating nut 501 on the interior thereof, the lower end of nut 500 being identical to end 302 of the nut of FIGS. 9-11. However, here floating nut 501 does not have an insert 313. Instead, the lower end 502 of internal threaded portion 309 is deformed inwardly as shown to provide a self-locking with the mated threaded shaft 18 of member 16 as heretofore discussed as seen in FIG. 13.

Thus, there is discussed a nut having a skirt lock which is swaged against a washer locking the same to a panel. The nut can then be threaded to a threaded fastener disposed in a sub-panel and may be provided with an internal floating nut portion to allow for misalignment. Self-locking means may be provided by deforming the nut or by providing a floating nut internally mounted therein; or by means of a plastic insert. The nut may be supplied to the end user with or without such self-locking feature. The nut 11 and washer 22 may be made of CRES 304 stainless steel and the panel 29 may be made of a composite material. The skirt 30 can be made of any desired length so as to allow for variations in thickness of the panel, particularly composite panels which vary greatly in thickness from panel to panel. This is illustrated in FIGS. 14 to 16 wherein panels 29', 29" and 29''' (FIGS. 14-16, respectively) have nut 11 of FIGS. 1 and 2 installed therein. When a customer specifies a particular panel thickness in which it is desired to install nut 11, such panel thickness may have a given panel thickness, such as 0.125" thick. This is panel 29" in FIG. 15. However, in practice, such panels can vary as much as ±0.015 inches from its given thickness. Thus, panel 29' in FIG. 14 may be about 0.140" thick whereas panel 29''' in FIG. 16 may be about 0.110" thick. The invention set forth herein enables nut 11 to be provided with a predetermined overall length, such as about 0.175" long with the overall length of skirt 30 being about 0.0675" long in FIGS. 14 to 16.

Washer 22 may be about 0.040" in overall thickness with the angle of taper as heretofore discussed. As seen in FIG. 14, when skirt 30 is swaged against washer 22 as shown, going from the solid line position 30 to the dotted line position 30', only a short length of skirt 30 abuts against washer 22. However, here the panel 29 is at its thickest and such skirt length is sufficient to retain nut 11 to panel 29.

As seen in FIG. 16, since panel 29''' is at its thinnest, a rather longer length of skirt 30 is swaged against panel 29'''. The skirt portion 30' in FIG. 15 swaged against washer 22 is in the middle length between that shown in FIGS. 14 and 16. It can thus be seen that a single nut length and skirt length can be provided to accommodate panels of varying thicknesses. If a panel of a different given thickness, such as 0.100 was required, then nut 11 could be provided in a different length, e.g., 0.150".

The thickness of washer 22 and angle a remains the same in FIGS. 14 to 16.

Figure 18:
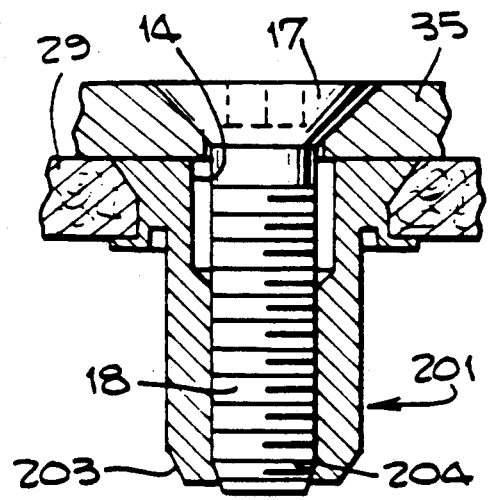
Figure 19:
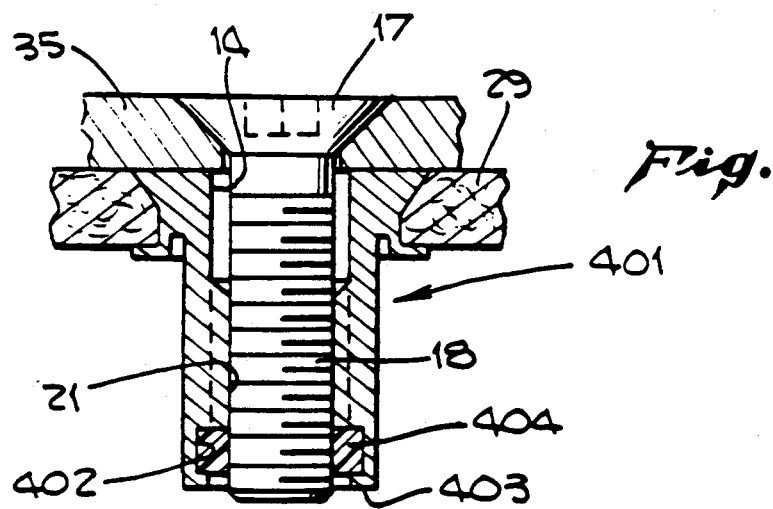
Figure 20:
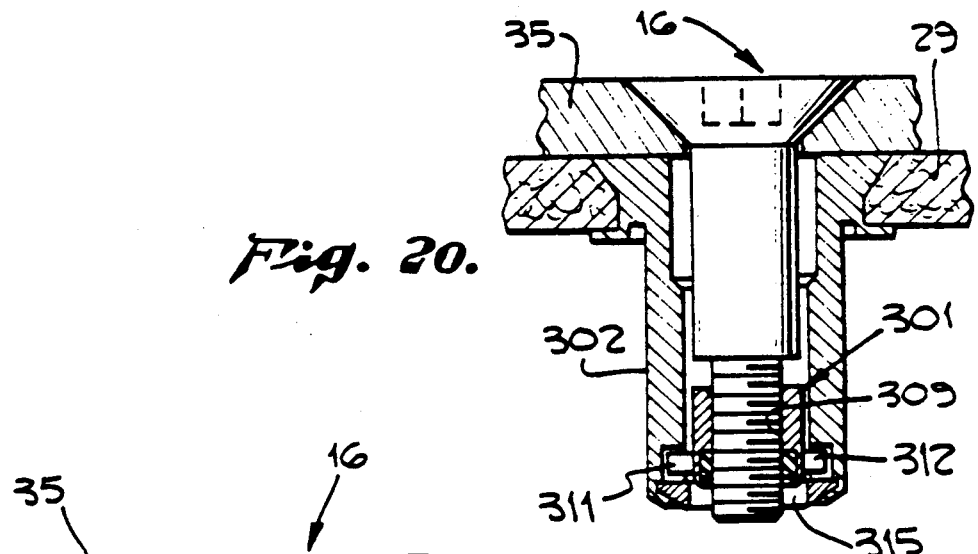
Figure 21:
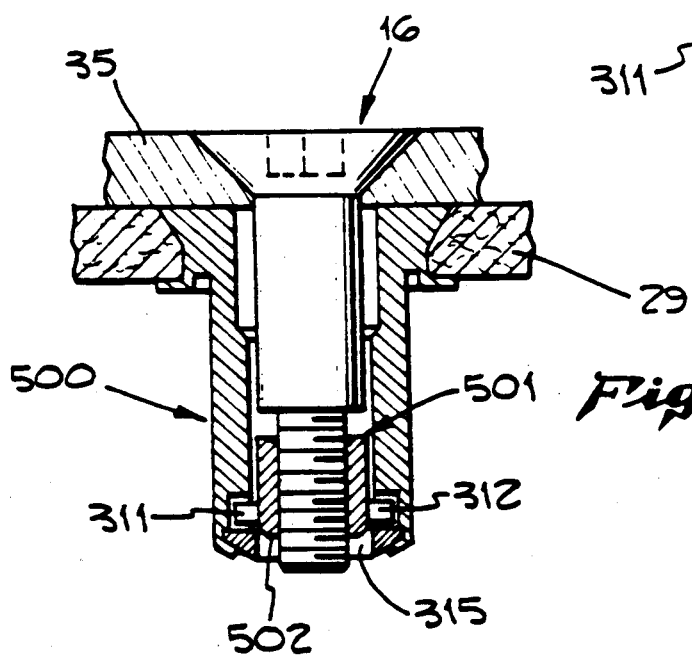

Of course, the washer 22 can be eliminated if the panel does not require such washers. For example, some panels, such as aluminum panels, are machined to a more accurate material thickness and the features that are obtained in using washer 22 are not required when the panel thickness variation is held to a closer tolerance range. Also other materials do not have the same kind of problems, such as the cracking or fracturing during installation of the nut. Thus, as seen in FIGS. 17 to 21, wherein like numerals refer to like parts of the embodiments of FIGS. 2, 4, 6, 11 and 13, respectively, washer 27 has been eliminated. That is, in FIGS. 17 to 21, the washer 27 has been eliminated and skirt 30 is swaged or deformed directly against the panel 29 as shown. The assemblies of FIGS. 17 to 21 may also have the antirotating features illustrated in FIGS. 7 and 8 and, since any such drawings would be identical to FIGS. 7 and 8, further illustration is deemed unnecessary.

By making washer 22 of stainless steel, a hardened surface is provided for skirt 30 to bear against. It can be seen that there is disclosed a single nut and washer assembly that can accommodate a given panel thickness wherein the given panel thickness may vary as much as plus or minus 10% from the given value. The embodiments of FIGS. 17 to 21 can be used where no need for a separate washer is called for.

I claim:

1. A fastener assembly for securing a nut in an opening in a panel, said panel having an access side and a blind side, said assembly comprising:
a nut having an enlarged head at one end disposed in said opening on the access side of said panel, said nut having a shank portion extending through said opening to the blind side of said panel, such nut having a threaded portion on said shank portion for threadably securing said nut to a mating threaded member, said nut having locking means associated therewith including a washer encircling said nut between said head and said shank portion on the blind side of said panel and a thin-walled skirt extending about the exterior of said nut between said head and said shank portion on the blind side of said panel swaged against said washer holding said nut to the blind side of said panel in a locking relationship with respect to said panel.

2. In the assembly of claim 1 wherein said skirt is an integral part of said nut.

3. In the assembly of claim 1 wherein said head includes a tapered underside and said skirt is a thin-walled portion of said nut extending downwardly from said tapered underside and first parallel to the longitudinal axis of said shank portion and spaced therefrom, then deformed or swaged against said washer.

4. In the assembly of claim 3 wherein said washer includes a flat portion on one side disposed against the blind side of said panel and a tapered portion on the other side of said washer against which said skirt is deformed or swaged.

5. In the assembly of claim 4 wherein said tapered portion tapers in a direction from the outside of said washer inwardly and upwardly toward the central axis thereof whereby said deformed or swaged skirt conforms to said tapered portion.

6. In the assembly of claim 1 wherein a countersunk hole leads into said opening and the enlarged head of said nut conforms to said hole.

7. In the assembly of claim 1 including non-rotating means associated with both said opening and said enlarged head of said nut for preventing rotation of said nut about its longitudinal axis.

8. In the assembly of claim 7 wherein said non-rotating means includes an irregularly shaped countersunk hole leading into said opening, said enlarged head being configured similarly to said hole.

9. In the assembly of claim 8 wherein said hole and said head are elliptically shaped.

10. In the assembly of claim 1 wherein the threaded portion of said nut includes threads on the interior of said shank portion.

11. In the assembly of claim 1 including a mating threaded member threaded into said threaded nut portion wherein the shank portion of said nut terminates a nose portion deformed inwardly toward the central longitudinal axis of said shank portion, said deformed nose portion engaging said mating threaded member to lock said nut to said threaded member.

12. In the assembly of claim 1 including a mating threaded member threaded into said threaded nut portion wherein the shank portion of said nut has a resilient insert therein engaging said threaded member to lock said nut to said threaded member.

13. In the assembly of claim 1 wherein the threaded portion of said nut includes said shank portion having a main body portion with a floating nut loosely disposed in said main body portion having threads on the interior thereof.

14. In the assembly of claim 13 including floating nut anti-rotating means associated with said floating nut and said main body portion for preventing rotation of said floating nut with respect to said main body portion.

15. In the assembly of claim 14 wherein said floating nut anti-rotating means includes said main body portion terminating in a nose having an apertured annular ring therein, the terminal end of said main body portion being thin-walled and swaged against said ring retaining said ring at the nose of said main body portion, a pair of spaced slots on diametrically opposite sides of said main body portion on the interior thereof between said ring and said enlarged head, said floating nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

16. In the assembly claim 15 including a mating threaded member threaded into said threaded throughbore of said floating nut wherein a resilient insert is mounted in said throughbore engaging said mating threaded member locking the same to said floating nut.

17. In the assembly of claim 16 including a mating threaded member threaded into said threaded throughbore of said floating nut, said floating nut having a nose portion deformed inwardly toward the central longitudinal axis of said floating nut engaging said threaded member locking the same to said floating nut.

18. A nut and washer assembly comprising;
a nut having a throughbore with an enlarged head at one end and a threaded portion at the other end of said nut having a thin-walled peripheral skirt portion on the underside of said head; and
a washer encircling the shank portion of said nut, said thin-walled peripheral skirt portion being swaged against said washer thereby retaining said washer to said nut.

19. In the assembly of claim 18 wherein said enlarged head is elliptically shaped.

20. In the assembly of claim 18 wherein said nut terminates in a nose portion deformed inwardly toward the central longitudinal axis thereof.

21. In the assembly of claim 18 wherein said nut terminates in a nose portion having an aperture of resilient insert mounted therein.

22. In the assembly of claim 18 wherein said threaded portion includes said shank portion having a main body portion comprising a threaded floating nut loosely mounted in said main body portion.

23. In the assembly of claim 22 including floating nut anti-rotating means associated with said floating nut and said main body portion for preventing rotation of said floating nut with respect to said main body portion.

24. In the assembly of claim 23 wherein said floating nut anti-rotating means includes said main body portion terminating in a nose having an apertured annular ring therein, the terminal end of said main body portion being thin-walled and swaged against said last-mentioned annular ring retaining said last-mentioned annular ring at the nose of said main body portion, a pair of spaced slots on diametrically opposite sides of said main body portion on the interior thereof between said last-mentioned annular ring and said enlarged head, said floating nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

25. In the assembly of claim 24 wherein said floating nut terminates in a nose portion deformed inwardly toward the central longitudinal axis of said floating nut.

26. In the assembly of claim 24 wherein said floating nut terminates in a nose portion having an apertured resilient insert mounted therein.

27. In the assembly of claim 13 including floating nut anti-rotating means associated with said floating nut and said main body portion for preventing rotation of said floating nut with respect to said main body portion.

28. In the assembly of claim 27 wherein said floating nut anti-rotating means includes said main body portion terminating in a nose having an apertured annular ring therein, the terminal end of said main body portion being thin-walled and swaged against said ring retaining said ring at the nose of said main body portion, a pair of spaced slots on diametrically opposite sides of said main body portion on the interior thereof between said ring and said enlarged head, said floating nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

29. In the assembly of claim 28 including a mating threaded member threaded into said threaded throughbore of said floating nut wherein a resilient insert is mounted in said throughbore engaging said mating threaded member locking the same to said floating nut.

30. In the assembly of claim 29 including a mating threaded member threaded into said threaded throughbore of said floating nut, said floating nut having a nose portion deformed inwardly toward the central longitudinal axis of said floating nut engaging said threaded member locking the same to said floating nut.

31. A fastener assembly for securing a nut in a a tapered opening in a panel, said panel having an access side and a blind side, said assembly comprising:
a nut having an enlarged head at one end disposed in said opening on the access side of said panel, said nut having a generally cylindrical shank portion extending through said opening to the blind side of said panel, such nut having a threaded portion on said shank portion for threadably securing said nut to a mating threaded member, said nut having a thin-walled skirt extending about the exterior of said nut between said head and said shank portion on the blind side of said panel swaged against said panel holding said nut to the blind side of said panel in a locking relationship with respect to said panel, said head including tapered underside fitting into said tapered opening and said skirt being a thin-walled portion of said nut extending downwardly from said tapered underside and first parallel to the longitudinal axis of said shank portion and spaced therefrom, then deformed or swaged against said panel providing a space between the distal end of said head and the distal end of said thin-walled portion trapping said panel therein.

32. In the assembly of claim 31 wherein said skirt is an integral part of said nut.

33. In the assembly of claim 31 wherein a countersunk hole leads into said opening and the enlarged head of said nut conforms to said hole.

34. In the assembly of claim 31 including non-rotating means associated with both said opening and said enlarged head of said nut for preventing rotation of said nut about its longitudinal axis.

35. In the assembly of claim 34 wherein said non-rotating means includes an irregularly shaped countersunk hole leading into said opening, said enlarged head being configured similarly to said hole.

36. In the assembly of claim 35 wherein said hole and said head are elliptically shaped.

37. In the assembly of claim 31 wherein the threaded portion of said nut includes threads on the interior of said shank portion.

38. In the assembly of claim 31 including a mating threaded member threaded into said threaded nut portion wherein the shank portion of said nut terminates a nose portion deformed inwardly toward the central longitudinal axis of said shank portion, said deformed nose portion engaging said mating threaded member to lock said nut to said threaded member.

39. In the assembly of claim 31 including a mating threaded member threaded into said threaded nut portion wherein the shank portion of said nut has a resilient insert therein engaging said threaded member to lock said nut to said threaded member.

40. In the assembly of claim 1 wherein the threaded portion of said nut includes said shank portion having a main body portion with a floating nut loosely disposed in said main body portion having threads on the interior thereof.

41. A nut assembly comprising:
a nut having a throughbore with an enlarged head at one end and a threaded portion at the other end of said nut having a thin-walled peripheral skirt portion on the underside of said head, said threaded portion including a main body portion having a threaded floating nut loosely mounted in said main body portion.

42. In the assembly of claim 41 wherein said enlarged head is elliptically shaped.

43. In the assembly of claim 41 wherein said nut terminates in a nose portion deformed inwardly toward the central longitudinal axis thereof.

44. In the assembly of claim 41 wherein said nut terminates in a nose portion having an apertured resilient insert mounted therein.

45. In the assembly of claim 41 including floating nut anti-rotating means associated with said floating nut and said main body portion for preventing rotation of said floating nut with respect to said main body portion.

46. In the assembly of claim 45 wherein said floating nut anti-rotating means includes said main body portion terminating in a nose having an apertured annular ring therein, the terminal end of said main body portion being thin-walled and swaged against said last-mentioned annular ring retaining said last-mentioned annular ring at the hose of said main body portion, a pair of spaced slots on diametrically opposites sides of said main body portion on the interior thereof between said last-mentioned annular ring and said enlarged head, said floating nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

47. In the assembly of claim 46 wherein said floating nut terminates in a nose portion deformed inwardly toward the central longitudinal axis of said floating nut.

48. In the assembly of claim 46 wherein said floating nut terminates in a nose portion having an apertured resilient insert mounted therein.

49. A nut and washer assembly comprising:
a nut having a throughbore with an enlarged head at one end and a threaded portion at the other end of said nut having a thin-walled peripheral skirt portion on the underside of said head, said threaded portion including said shank portion having a main body portion comprising a threaded floating nut loosely mounted in said main body portion;
a washer encircling the shank portion of said nut; and
floating nut anti-rotating means associated with said floating nut and said main body portion for preventing rotation of said floating nut with respect to said main body portion, said floating nut anti-rotating means including said main body portion terminating in a nose having an apertured annular ring therein, the terminal end of said main body portion being thin-walled and swaged against said last-mentioned annular ring retaining said last-mentioned annular ring at the nose of said main body portion, a pair of spaced slots on diametrically opposite sides of said main body portion on the interior thereof between said last-mentioned annular ring and said enlarged head, said floating nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

50. In the assembly of claim 49 wherein said floating nut terminates in a nose portion deformed inwardly toward the central longitudinal axis of said floating nut.

51. In the assembly of claim 49 wherein said floating nut terminates in a nose portion having an apertured resilient insert mounted therein.

* * * * *

UNITED STATES PATENT AND TRADEMARK OFFICE
CERTIFICATE OF CORRECTION

PATENT NO. : 5,006,025
DATED : April 9, 1991
INVENTOR(S) : John A. Duran

It is certified that error appears in the above-identified patent and that said Letters Patent is hereby corrected as shown below:

Col. 10, line 5, "hose" should be --nose--.

Signed and Sealed this

Twenty-ninth Day of September, 1992

Attest:

DOUGLAS B. COMER

*Attesting Officer*     *Acting Commissioner of Patents and Trademarks*